(12) United States Patent
Or et al.

(10) Patent No.: US 11,135,803 B2
(45) Date of Patent: Oct. 5, 2021

(54) SYSTEM FOR IMPRESSING A RELIEF PATTERN ON A SUBSTRATE

(71) Applicant: HIGHCON SYSTEMS LTD., Yavne (IL)

(72) Inventors: Ron Or, Tel Aviv (IL); Michael Karp, Petah-Tikva (IL); Claudio Rottman, Modiin (IL)

(73) Assignee: HIGHCON SYSTEMS LTD., Yavne (IL)

( * ) Notice: Subject to any disclaimer, the term of this patent is extended or adjusted under 35 U.S.C. 154(b) by 344 days.

(21) Appl. No.: 16/304,287

(22) PCT Filed: May 25, 2017

(86) PCT No.: PCT/IB2017/053087
§ 371 (c)(1),
(2) Date: Nov. 25, 2018

(87) PCT Pub. No.: WO2017/203464
PCT Pub. Date: Nov. 30, 2017

(65) Prior Publication Data
US 2019/0091961 A1    Mar. 28, 2019

(30) Foreign Application Priority Data

May 26, 2016   (GB) .................................... 1609363

(51) Int. Cl.
*B31F 1/07*    (2006.01)
*B31F 1/10*    (2006.01)
(Continued)

(52) U.S. Cl.
CPC .............. *B31F 1/07* (2013.01); *B29C 59/046* (2013.01); *B31F 1/08* (2013.01); *B31F 1/10* (2013.01); *B44B 5/0047* (2013.01); *B44B 5/026* (2013.01)

(58) Field of Classification Search
CPC ........ B31F 1/10; B31F 1/08; B29L 2931/757; B29C 47/0009; B29C 59/046; C08F 2/46; C08F 2/50; B44B 5/0047; B44B 5/026
See application file for complete search history.

(56) References Cited

U.S. PATENT DOCUMENTS 4,044,500 A    8/1977    Hitzman
4,092,198 A *  5/1978    Scher .................... B29C 59/046
                                                        156/222

(Continued)

FOREIGN PATENT DOCUMENTS

CN    101342840 A    1/2009
CN    104066542 A    9/2014

(Continued)

OTHER PUBLICATIONS

Polymeric Rule Die, Rottman et al., May 19, 2014, GB Patent Office (Year: 2014).*

*Primary Examiner* — David H Banh
(74) *Attorney, Agent, or Firm* — Daniel Feigelson; Fourth Dimension Ip

(57) ABSTRACT

A die and counter die system for impressing a relief pattern onto a substrate, including at least one male die including a contact surface and defining a relief pattern, a compressible counter film including a base layer, a contact layer disposed opposite the contact surface of the at least one male die and spaced therefrom, and a compressible layer disposed between the base layer and the contact layer and attached thereto. The contact layer is featureless in a region thereof opposing the relief pattern on the at least one male die. The compressible counter film has a compressibility, in a direction perpendicular to a broad face of the compressible counter film, in the range of 5-30% at 1.35 MPa. The system further includes a compression mechanism adapted to move (Continued)

the at least one male die and the compressible counter film towards one another in an operative mode.

18 Claims, 5 Drawing Sheets

(51) Int. Cl.
  *B44B 5/00*  (2006.01)
  *B44B 5/02*  (2006.01)
  *B31F 1/08*  (2006.01)
  *B29C 59/04*  (2006.01)

(56) References Cited

U.S. PATENT DOCUMENTS

| | | | |
|---|---|---|---|
| 6,059,914 A | 5/2000 | Suss | |
| 2005/0039619 A1* | 2/2005 | Invernizzi | B41N 10/04 |
| | | | 101/376 |
| 2006/0040816 A1* | 2/2006 | Gordon | B31B 50/25 |
| | | | 493/59 |
| 2006/0060095 A1* | 3/2006 | Iwasaki | B41N 10/04 |
| | | | 101/376 |
| 2007/0062394 A1* | 3/2007 | Damewood | B41N 10/04 |
| | | | 101/376 |
| 2007/0101884 A1* | 5/2007 | Czerner | B41N 10/06 |
| | | | 101/375 |
| 2007/0119320 A1* | 5/2007 | Byers | B41N 10/00 |
| | | | 101/375 |
| 2008/0202362 A1 | 8/2008 | Stravitz | |
| 2008/0302255 A1* | 12/2008 | Koivukunnas | B29C 59/046 |
| | | | 101/27 |
| 2009/0134534 A1* | 5/2009 | Koivukunnas | B29C 59/026 |
| | | | 264/1.33 |
| 2009/0142587 A1* | 6/2009 | Byers | B41N 10/04 |
| | | | 428/335 |
| 2011/0135899 A1* | 6/2011 | Meltzer | F16L 55/1656 |
| | | | 428/217 |
| 2011/0194913 A1 | 12/2011 | Zimmer et al. | |
| 2013/0126489 A1 | 5/2013 | Buschulte | |
| 2014/0109783 A1* | 4/2014 | Queen | B41F 17/08 |
| | | | 101/401.1 |
| 2014/0117587 A1* | 5/2014 | Aoya | B29C 59/02 |
| | | | 264/403 |
| 2014/0299010 A1* | 10/2014 | Messer | B41F 30/04 |
| | | | 101/401.1 |
| 2017/0113432 A1 | 4/2017 | Rottman | |
| 2017/0313018 A1 | 11/2017 | Pessotto | |

FOREIGN PATENT DOCUMENTS

| | | | | |
|---|---|---|---|---|
| CN | 104191652 A | 12/2014 | | |
| DE | 1577909 A | 6/1970 | | |
| WO | 2015/155685 A1 | 10/2015 | | |
| WO | WO2015-155685 | * 10/2015 | | B29C 48/03 |
| WO | 2016/074798 A1 | 5/2016 | | |

* cited by examiner

SYSTEM FOR IMPRESSING A RELIEF PATTERN ON A SUBSTRATE

FIELD OF THE INVENTION

The present invention relates to die and counter die systems and, more particularly, to a die and counter die systems including a die and a compressible counter film.

SUMMARY OF THE INVENTION

According to one aspect of the present invention there is provided a system for impressing a relief pattern on a substrate, the system including:
- at least one male die including a contact surface defining the relief pattern;
- a compressible counter film including:
  - a base layer;
  - a contact layer disposed opposite the contact surface of the at least one male die and spaced therefrom; and
  - a compressible layer disposed between the base layer and the contact layer and attached thereto,
  - the contact layer being featureless in a region thereof opposing the relief pattern on the at least one male die,
  - the compressible counter film having a compressibility, in a direction perpendicular to a broad face of the compressible counter film, in the range of 5-30% at 1.35 MPa; and
- a compression mechanism adapted to move the at least one male die and the compressible counter film towards one another in an operative mode;

wherein, in the operative mode, when the substrate is disposed between the contract surface and the contact layer, the compression mechanism moves the at least one male die and the compressible counter film towards one another, such that the at least one male die engages a first broad surface of the substrate and the contact layer of the compressible counter film engages an opposing broad surface of the substrate, so as to impress the relief pattern on the substrate.

In some embodiments, the compressibility of the compressible counter film is within the range of 6-30%, 9-25%, 9-20%, or 9-15% at 1.35 MPa.

In some embodiments, the compressible counter film further includes a reinforcing fabric layer adapted to provide structural reinforcement to the compressible counter film and a rubber layer attached along a broad face thereof to the reinforcing fabric layer.

In some embodiments, the reinforcing fabric layer includes a woven fabric. In some embodiments, the reinforcing fabric layer includes a material selected from the group consisting of polyester, rayon, and cotton. In some embodiments, the reinforcing fabric layer is impregnated with a rubber-based material. In some embodiments, the reinforcing layer has a thickness in the range of 0.15 mm to 1 mm.

In some embodiments, the rubber layer has a thickness in the range of 0.15 mm to 5 mm, 0.15 mm to 4 mm, 0.15 m to 3 mm, 0.15 mm to 2 mm, or 0.15 mm to 1 mm.

In some embodiments, the first broad face of the rubber layer is attached to a first broad face of the reinforcing layer, the second broad face of the rubber layer is disposed adjacent the base layer, and the second broad face of the reinforcing layer is disposed adjacent the compressible layer.

In some embodiments, the compressible counter film has a thickness in the range of 0.75 mm to 10 mm, 1 mm to 9 mm, 2 mm to 8 mm, or 3 mm to 7 mm. In some embodiments, the contact layer of the compressible counter film has a Shore A hardness in the range of 10 to 80 or 20 to 70.

In some embodiments, the compressible counter film further including a surface modulating layer disposed between the base layer and the contact layer and adapted such that, in the operative mode, when pressure applied to the contact layer exceeds an amount of pressure required to fully compress the compressible layer, the surface modulating layer responds by modulating at least one of a height and a surface area of a deformation formed on the contact layer.

According to another aspect of the present invention there is provided a system for impressing a relief pattern on a substrate, the system including:
- at least one male die including a contact surface defining the relief pattern;
- a compressible counter film including:
  - a base layer;
  - a contact layer disposed opposite the contact surface of the at least one male die and spaced therefrom;
  - a compressible layer disposed between the base layer and the compressible layer and attached thereto; and
  - a surface modulating layer disposed between the base layer and the contact layer;
  - the contact layer being featureless in a region thereof opposing the relief pattern on the at least one male die; and
- a compression mechanism adapted to move the at least one male die and the compressible counter film towards one another, in an operative mode;

wherein, in an operative mode, when the substrate is disposed between the contract surface and the contact layer, the compression mechanism moves the at least one male die and the compressible counter film towards one another, such that the at least one male die engages a first broad surface of the substrate and the contact layer of the compressible counter film engages an opposing broad surface of the substrate, so as to impress the relief pattern on the substrate;

and wherein the surface modulating layer adapted such that, in the operative mode, when pressure applied to the contact layer exceeds a pressure required to fully compress the compressible layer, the surface modulating layer responds by modulating at least one of a height and a surface area of a deformation formed on the contact layer, surrounding the relief pattern.

In some embodiments, the compressible counter film has a compressibility, in a direction perpendicular to a broad face of the compressible counter film, in the range of 5-30%, 6-30%, 9-25%, 9-20%, or 9-15% at 1.35 MPa.

In some embodiments, the surface modulating layer is attached along a first broad face thereof to the compressible layer and along a second broad face thereof to the contact layer.

In some embodiments, the surface modulating layer is adapted to inhibit the contact layer from separating from the compressible layer or from being rotationally shifted relative thereto during impression of the relief pattern on the substrate.

In some embodiments, the surface modulating layer is adapted to increase an amount of pressure that can be applied to the contact layer at a time of impression without damaging the substrate or the relief pattern impressed thereon.

In some embodiments, the surface modulating layer has a thickness in the range of 0.15 mm to 1 mm. In some embodiments, the surface modulating layer including a fabric layer impregnated with a rubber-based material.

In some embodiments, the fabric layer includes at least one material selected from the group consisting of polyester, rayon, and cotton. In some embodiments, the fabric layer includes a woven fabric layer. In some embodiments, the woven fabric layer has a density in the range of 10 to 30 threads per cm.

In some embodiments, the fabric layer includes at least two layers of fabric attached to one another. In some embodiments, the at least two layers of fabric are laminated to one another. In some embodiments, the at least two layers of fabric are attached to one another by an adhesive.

In some embodiments, the rubber-based material includes a material selected from the group consisting of acrylonitrile butadiene copolymer rubber, EPDM rubber, and chloroprene rubber. In some embodiments, the rubber-based material includes at least one of a vulcanizing agent, a vulcanizing accelerator, and a softening agent.

In some embodiments, the contact layer of the compressible counter film has a Shore A hardness in the range of 60-90 or 65-75.

In some embodiments, the compressible counter film has a thickness in the range of 0.5 mm to 10 mm, 1 mm to 8 mm, 1 mm to 6 mm, 1 mm to 5 mm, 1 mm to 3 mm, or 1 mm to 2 mm.

In some embodiments, the base layer has a thickness in the range of 0.15 mm to 1 mm.

In some embodiments, the base layer includes a metal layer. In some embodiments, the metal layer includes at least one of aluminum and steel.

In some embodiments, the base layer includes a polymer layer. In some embodiments, the polymer layer includes PET.

In some embodiments, the base layer includes a fabric layer. In some embodiments, the fabric layer includes a material selected from the group consisting of polyester, rayon, and cotton. In some embodiments, the fabric layer includes a woven fabric. In some embodiments, the woven fabric has a density in the range of 10 to 30 threads per cm.

In some embodiments, the fabric layer includes at least two layers of fabric attached to one another. In some embodiments, the at least two layers of fabric are laminated to one another. In some embodiments, the at least two layers of fabric are attached to one another by an adhesive.

In some embodiments, the fabric layer is impregnated with a rubber-based material. In some embodiments, the rubber-based material includes a material selected from the group consisting of acrylonitrile butadiene copolymer rubber, EPDM rubber, and chloroprene rubber.

In some embodiments, the rubber-based material includes at least one of a vulcanizing agent, a vulcanization accelerator, an auxiliary vulcanization accelerator, a filler, a reinforcer, a softener, a plasticizer, and an antioxidant.

In some embodiments, the compressible layer is adapted to decrease lateral deformation resulting from pressure applied to the compressible counter film. In some embodiments, the compressible layer is adapted to enable the relief pattern impressed on the substrate to be sharper.

In some embodiments, the compressible layer has a thickness in the range of 0.15 mm to 5 mm, 0.15 mm to 4 mm, 0.15 mm to 3 mm, 0.15 mm to 2 mm, or 0.15 mm to 1 mm.

In some embodiments, the compressible layer includes a rubber foam layer. In some embodiments, the rubber foam layer includes a synthetic rubber. In some embodiments, the synthetic rubber includes at least one material selected from the group consisting of acrylonitrile-butadiene copolymer rubber, butadiene rubber, poly-isoprene rubber, butyl rubber, chloroprene rubber, EPDM rubber, and polyurethane rubber.

In some embodiments, the compressible layer is directly attached to the base layer. In some embodiments, the compressible layer is attached to the base layer by at least one of an adhesive and lamination.

In some embodiments, the contact layer includes a rubber-based material. In some embodiments, the rubber based material includes at least one synthetic rubber. In some embodiments, the at least one synthetic rubber includes at least one material selected from the group consisting of acrylonitrile-butadiene rubber (NBR), hydrogenated NBR, butadiene rubber, poly-isoprene rubber, butyl rubber chloroprene rubber (CR), polyurethane rubber, EPDM rubber, polysulfide rubber, and acrylic rubber.

In some embodiments, the rubber-based material further includes at least one of a vulcanizing agent, a vulcanization accelerator, an auxiliary vulcanization accelerator, a filler, a reinforcer, a softener, a plasticizer, and an antioxidant.

In some embodiments, the contact layer includes a compressible rubber based material.

In some embodiments, the contact layer has a thickness in the range of 0.1 mm to 5 mm, 0.1 mm to 4 mm, 0.1 mm to 3 mm, 0.1 mm to 2 mm, or 0.1 mm to 1 mm.

In some embodiments, the at least one male die includes at least one rule die adapted to impress onto the substrate at least one crease line as the relief pattern. In some embodiments, the at least one male die includes at least one debossing die adapted to deboss the substrate to form the relief pattern thereon.

In some embodiments, at least one of the at least one male die and the compressible counter film is mounted onto a rotating drum. In some embodiments, the at least one male die is mounted onto a first rotating drum and the compressible counter film is mounted onto a second rotating drum.

In some embodiments, upon application of pressure to the compressible counter film, the compressible layer absorbs the pressure by compressing until the compressible layer is substantially incompressible.

In some embodiments, the substrate includes a fibrous substrate. In some embodiments, the fibrous substrate includes a corrugated substrate. In some embodiments, the fibrous substrate includes paper. In some embodiments, the paper includes a paper coated by a metal foil. In some embodiments, the paper includes a paper coated by a plastic coating. In some embodiments, the substrate has a thickness in the range of 0.1-5 mm.

In some embodiments, the substrate includes a metal foil. In some embodiments, the metal foil is selected from the group consisting of a copper foil and an aluminum foil. In some embodiments, the metal foil includes a shape memory metal alloy foil. In some embodiments, the metal foil has a thickness in the range of 0.02 mm to 0.2 mm.

In some embodiments, the substrate includes a plastic substrate. In some embodiments, the plastic substrate has a thickness in the range of 0.05 mm to 0.5 mm. In some embodiments, the system further includes a heating mechanism for applying heat to the plastic substrate during impression of the relief pattern thereon.

According to yet another aspect of the present invention there is provided a method for impressing a relief pattern on a substrate, the method including:

placing a substrate between at least one male die and a compressible counter film, wherein the at least one male die includes a contact surface defining the relief pattern, and wherein the compressible counter film includes:

a base layer;

a contact layer disposed opposite the contact surface of the at least one male die and spaced therefrom; and a compressible layer disposed between the base layer and the contact layer and attached thereto, the contact layer being featureless in a region thereof opposing the relief pattern on the at least one male die, the compressible counter film having a compressibility, in a direction perpendicular to a broad face of the compressible counter film, in the range of 5-30% at 1.35 MPa; and moving the at least one male die and the compressible counter film towards one another such that the at least one male die engages a first broad surface of the substrate and the contact layer of the compressible counter film engages an opposing broad surface of the substrate so as to impress the relief pattern on the substrate.

In some embodiments, the substrate includes a fibrous substrate. In some embodiments, the fibrous substrate includes a corrugated substrate. In some embodiments, the fibrous substrate includes paper. In some embodiments, the paper includes a paper coated by a metal foil. In some embodiments, the paper includes a paper coated by a plastic coating. In some embodiments, the substrate has a thickness in the range of 0.1-5 mm.

In some embodiments, the substrate includes a metal foil. In some embodiments, the metal foil is selected from the group consisting of a copper foil and an aluminum foil. In some embodiments, the metal foil includes a shape memory metal alloy foil. In some embodiments, the metal foil has a thickness in the range of 0.02 mm to 0.2 mm.

In some embodiments, the substrate includes a plastic substrate. In some embodiments, the plastic substrate has a thickness in the range of 0.05 mm to 0.5 mm. In some embodiments, the method further includes applying heat to the plastic substrate during impression of the relief pattern thereon.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings.

DESCRIPTION OF THE PREFERRED EMBODIMENTS

The present invention relates to die and counter die systems and, more particularly, to a die and counter die systems including a die and a compressible counter film.

Figure 1A:
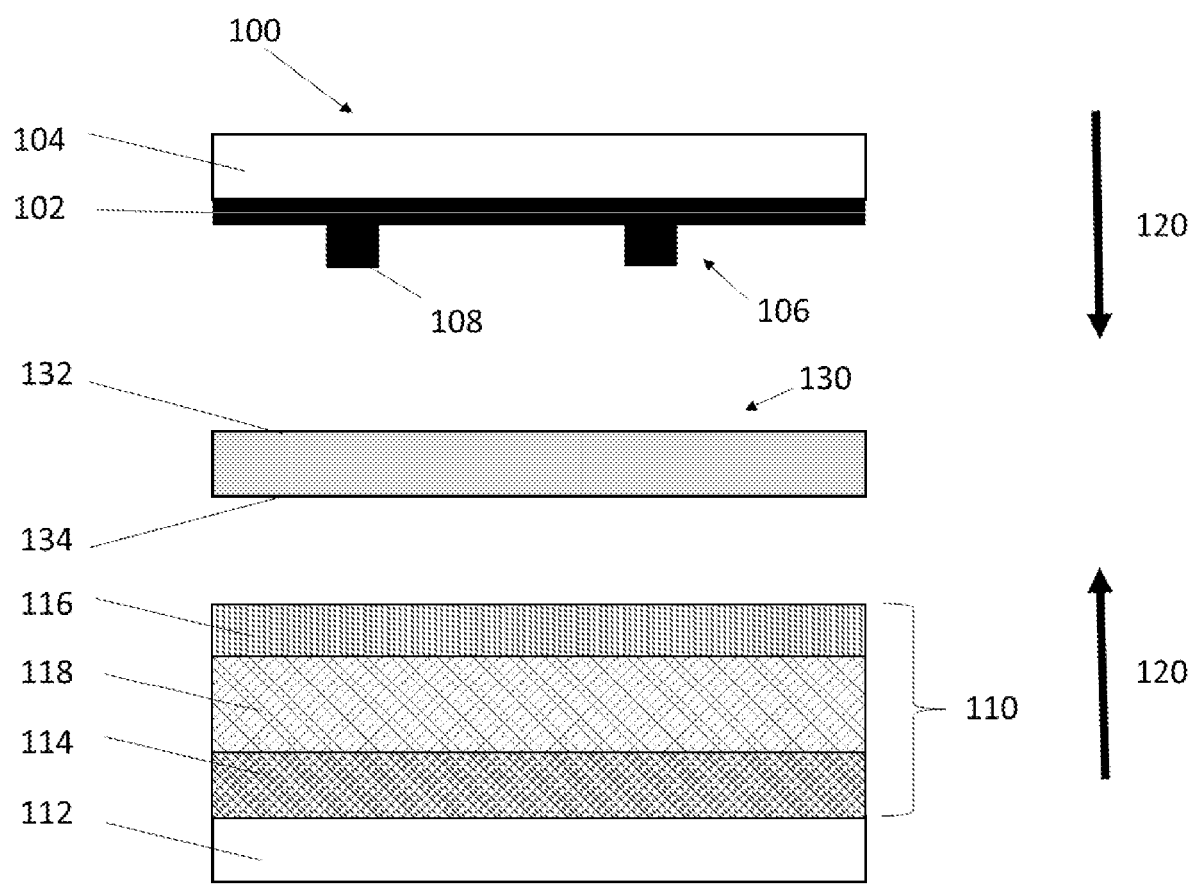
FIGS. 1A and 1B are schematic cross-sectional diagram of two embodiments of an inventive die and counter die system for impressing a relief pattern on a substrate in accordance with aspects of the present invention.
Figure 1B:
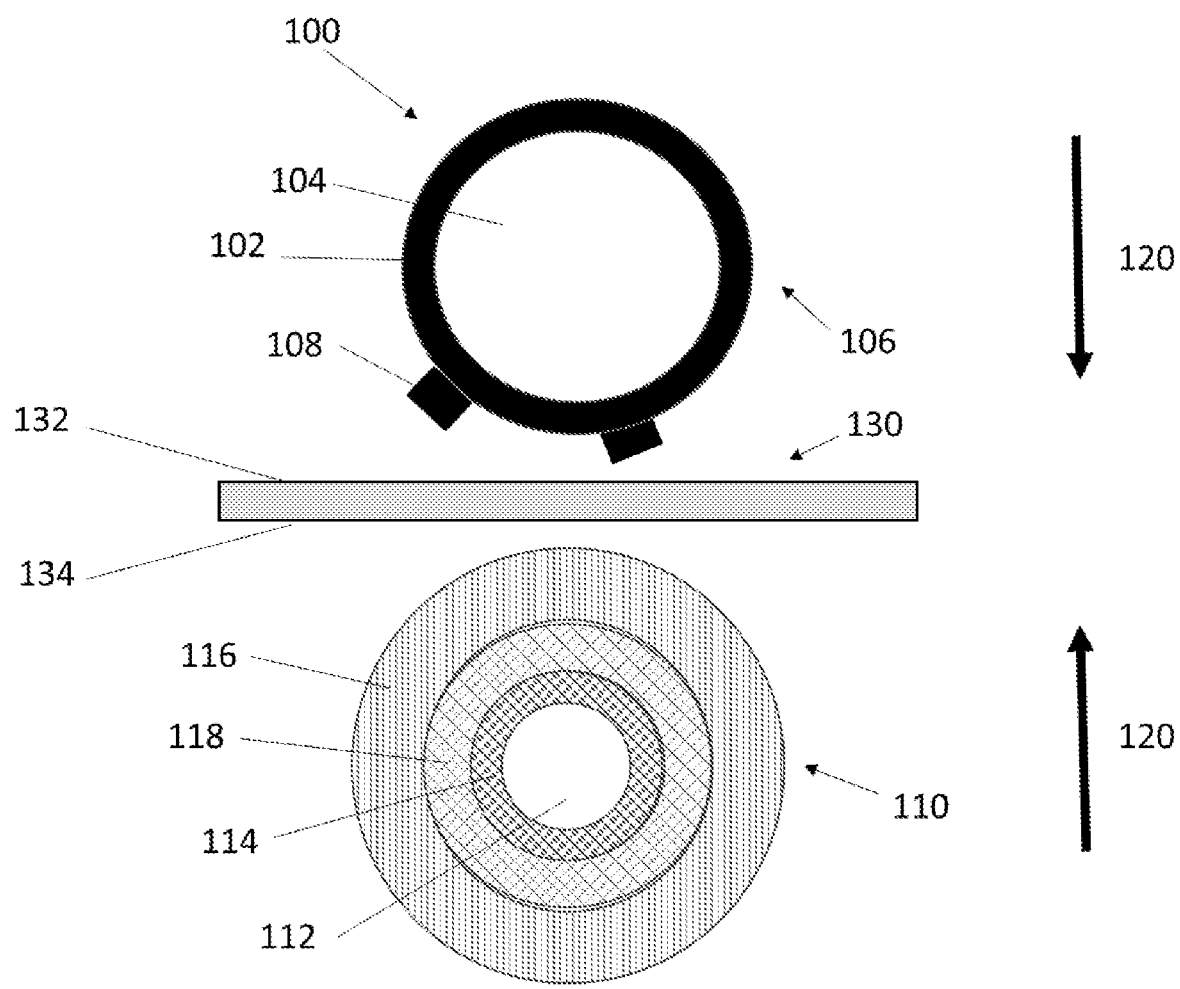

Reference is now made to FIGS. 1A and 1B, which are schematic cross-sectional diagram of two embodiments of an inventive die and counter die system for impressing a relief pattern on a substrate in accordance with aspects of the present invention.

As seen in FIGS. 1A and 1B, a system 100 for impressing a relief pattern on a substrate includes a male die 102 mounted onto a base 104, the male die having a contact surface 106 defining the relief pattern, to be impressed onto a substrate as described hereinbelow. The base 104 may be a flat, or planar base, as illustrated in FIG. 1A, or may be a rotating drum, as illustrated in FIG. 1B.

In the illustrated embodiment, the male die 102 comprises a rule die including one or more rules 108 adapted to impress onto a substrate a crease line as the relief pattern. In other embodiments, the male die 102 comprises a debossing die, adapted to deboss a substrate to form the relief pattern thereon. However, it will be appreciated that the male die 102 may have any suitable structure, including text and/or a textures pattern.

The male die 102 and/or the portion thereof defining the relief pattern may be formed of metal, a polymeric material, or any other suitable material, and may be created using any suitable mechanism, including ink jet printing, three dimensional printing, milling, casting, sintering, or using Surface Adhesive Rule Technology as described in PCT application publication number WO2011/145092 filed May 17, 2011 and entitled "Method and System for Surface Adhesive Rule Technology", in PCT application publication number WO2015/155685 filed Apr. 7, 2015 and entitled "Polymeric Rule Die, and Formulations Therefor", and in PCT application publication number WO2013/030828 filed Sep. 3, 2012 and entitled "Method and System for a Multiple Orifice Nozzle", all of which are incorporated by reference as if fully set forth herein. In some embodiments, the rules 108 may be formed of a different material than the male die 102.

Disposed opposite male die 102, and spaced therefrom, is a multi-layered compressible counter film 110 mounted on a base 112. As explained in further detail hereinbelow with reference to FIGS. 2A to 2C, the compressible counter film includes at least a base layer 114 adjacent base 112, a contact layer 116, disposed opposite the contact surface 106 of male die 102, and a compressible layer 118 disposed between base layer 114 and contact layer 116.

The compressible counter film 110 is featureless, or a plain flat film, in an area opposing the relief pattern of the male die 102. In some embodiments, the compressible counter film 110, or at least contact layer 116, is completely featureless, whereas in other embodiments the compressible counter film 110 may include one or more features, whether features of a male die, a female die, textures, or any other features, in an area which does not oppose the relief pattern of the male die 102.

The base 112 may be a flat, or planar base, as illustrated in FIG. 1A, or may be a rotating drum, as illustrated in FIG. 1B.

In some embodiments, in which bases 104 and 112 are both rotating drums, as illustrated in FIG. 1B, rotating drums 104 and 112 may have the same diameter.

A compression mechanism is functionally associated with male die 102 and with compressible counter film 110, or with bases 104 and 112 thereof, and is adapted to move the male die 102 and the compressible counter film 110 towards one another, as indicated by arrows 120. The compression mechanism may be any suitable compression mechanism, such as a gear based mechanism or a hydraulic mechanism.

In use, a substrate 130 is placed between contact surface 106 male die 102 and contact layer 116 of compressible counter film 110, and the compression mechanism moves male die 102 and compressible counter film 110 towards one another, such that the male die engages a first surface 132 of the substrate and the contact layer 116 of the compressible counter film 110 engages an opposing surface 134 of the substrate so as to impress the relief pattern defined by contact surface 106 on the substrate 130.

In the context of the present application and the claims herein, the term "substrate" relates to a workpiece having an impressionable substrate, which, following impression of a broad surface of the substrate by a die and counter-die system, under ambient and/or above-ambient conditions, the impression pattern, after disengagement from the die and counter-die system, is maintained or at least substantially maintained. Such substrates typically include fibrous paper substrates (including, but not limited to, paper, boxboard, cardboard, cardboard with a metalized coating, laminated paper, and laminated cardboard), and metal foils (e.g., aluminum foil, copper foil, and a shape memory metal alloy foil such as nitinol foils), as well as various plastic films, including shape memory plastic films such as polyurethane shape memory plastic films.

In some embodiments, the substrate 130 may be a fibrous substrate such as paper, boxboard, or cardboard, which may be corrugated, and which may have a thickness in the range of 0.1 mm to 5 mm.

In some embodiments the substrate may be a paper laminated with a plastic film such as a polypropylene or polyester film, and may have a thickness in the range of 0.1 mm to 5 mm. In some embodiments, the substrate may be a paper covered in a metallic coating, and may have a thickness in the range of 0.1 mm to 5 mm.

In some embodiments, the substrate may be a metal foil, such as aluminum foil or copper foil, which may have a thickness in the range of 0.02 mm to 0.2 mm. In some embodiments, the substrate may be a shape memory metal alloy foil, such as a Nitinol foil, which may have a thickness in the range of 0.02 mm to 0.2 mm.

In some embodiments, the substrate may be a plastic substrate, such as polyvinylchloride, polypropylene, polycarbonate, or polyester, or a polyurethane shape memory plastic film, which may have a thickness in the range of 0.05 mm to 0.5 mm. In some such embodiments, impression of a relief pattern onto the substrate may be accomplished at an elevated temperature, as known in the art of hot embossing or thermal embossing. In some such embodiments, heat may be applied to the substrate internally by heating base 104, for example via running a hot liquid through the base or via electrical heating of the drum surface, or externally, for example by placing a heat source, such as a halogen lamp, adjacent the male die such that the substrate and/or the relief pattern is heated during the impression process.

Figure 2A:
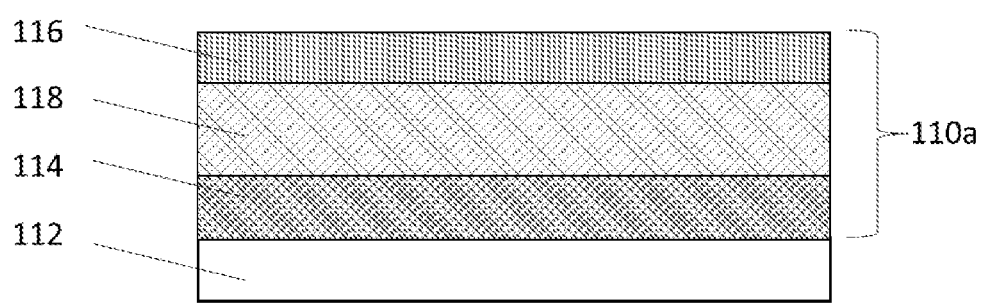
FIGS. 2A, 2B, and 2C are schematic cross-sectional diagram of three embodiments of inventive compressible counter films, usable in the systems of FIGS. 1A and 1B, in accordance with aspects of the present invention.
Figure 2B:
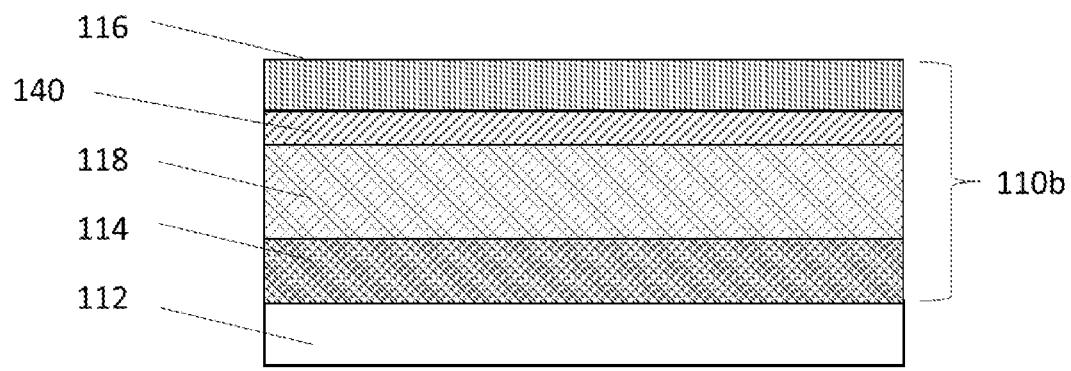
Figure 2C:
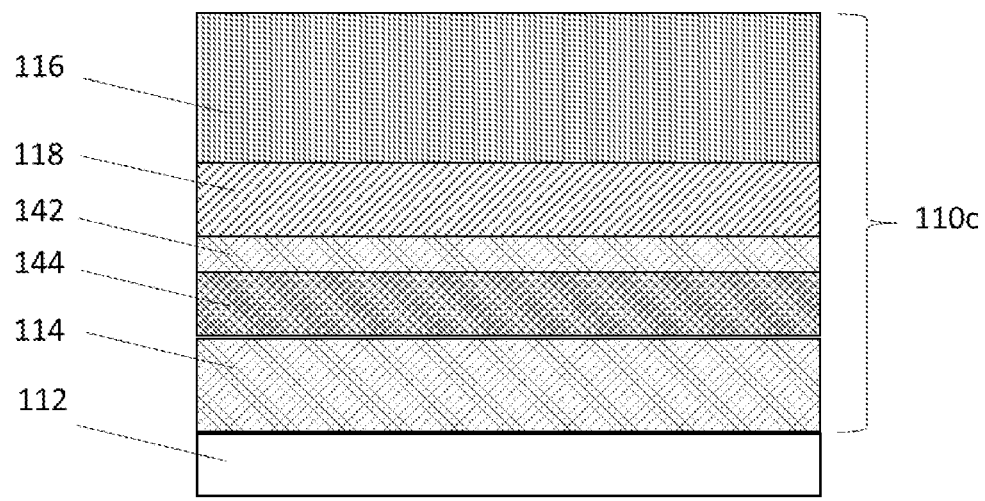

Reference is now made to FIGS. 2A, 2B, and 2C, which are schematic cross-sectional diagram of embodiments of inventive compressible counter films 110, mounted on a base 112 and usable in the systems of FIGS. 1A and 1B, in accordance with aspects of the present invention.

FIG. 2A illustrates a basic compressible counter film 110a mounted onto base 112, and including a base layer 114, a compressible layer 118, and a contact layer 116, as described hereinabove with reference to FIGS. 1A and 1B.

In some embodiments, the base layer 114, which may also be thought of as a supporting layer adapt to mechanically support the compressible counter film 110, may have a thickness in the range of 0.15 mm to 1 mm.

In some embodiments, base layer 114 includes a metal layer, such as an aluminum or steel layer.

In some embodiments, base layer 114 includes a polymer layer, such as a PET layer.

In some embodiments, base layer 114 includes a fabric, or textile layer, particularly a fabric layer, such as a polyester, rayon, or cotton layer. In some embodiments, the fabric layer may include a woven fabric, which in some embodiments has a density in the range of 10-30 threads/cm.

In some embodiments, base layer 114 includes two or more layers of fabric, directly attached to one another, for example by lamination, adhesive, or any other suitable attachment method known in the art.

In some embodiments, the fabric forming base layer 114 includes, or is impregnated with, a rubber based material, such as acrylonitrile butadiene copolymer rubber, chloroprene rubber, or EPDM rubber. The rubber based material may be introduced into the fabric using any suitable method known in the art, for example by coating the rubber material on the fabric with a blade coater or by calendering. In some embodiments, the rubber based material includes a vulcanizing agent such as organic peroxides, as well as sulfur, organic sulfur-containing compound, and the like. In some embodiments, the rubber based material includes a vulcanizing accelerator such as inorganic accelerators (e.g., calcium hydroxide, magnesia (MgO), and the like) and organic accelerators (e.g., thiurams, dithiocarbamates, and thiazoles). In some embodiments the rubber-based material includes a softening agent such as fatty acid, cottonseed oil, tall oil, an asphalt substance, paraffin wax, and the like.

The compressible layer 118 is adapted to decrease lateral deformation resulting from pressure applied to compressible counter film 110, as shown hereinbelow with reference to FIG. 3B. Additionally, the compressible layer is adapted to enable the relief pattern impressed on the substrate to be sharper, for example by enabling increased debossing or creasing depths, sharper angles to debossed features or to crease lines, and the like.

In some embodiments, compressible layer 118 has a thickness in the range of 0.15 mm to 5 mm, 0.15 mm to 4 mm, 0.15 mm to 3 mm, 0.15 mm to 2 mm, or 0.15 mm to 1 mm. In some embodiments, compressibility of the compressible layer 118 is due to foam content therein.

In some embodiments, the compressible layer 118 comprises a rubber foam layer, which may include a synthetic rubber as a rubber matrix thereof. In some such embodiments, the synthetic rubber may include one or more of acrylonitrile-butadiene copolymer rubber, butadiene rubber, polyisoprene rubber, butyl rubber, chloroprene rubber, EPDM rubber and polyurethane rubber. The compressible layer may be generated using any suitable method known in the art, such as, for example, the leaching method, as described in the Encyclopedia of Polymer Science and Technology, Concise, By Herman F. Mark, 3rd edition, or the foaming agent method, as described in The Complete Book on Rubber Processing and Compounding Technology (with Machinery Details), 2nd Revised Edition, NIIR Board of Consultants and Engineers, 2016, both of which are incorporated by reference as if fully set forth herein. In some such embodiments, the supporting base used for the leaching method may be a fabric layer, such as a woven fabric layer. It will be appreciated that the foam content in the compressible layer 118 may depend on the amount of water-soluble powder used in the leaching method.

The compressible layer 118 may be directly attached to said base layer, for example by lamination or by means of an adhesive, or may be attached to intermediate layers, such as surface modulating layer 140 or rubber layer 144.

In some embodiments, the contact layer 116 has a thickness in the range of 0.1 mm to 5 mm, 0.1 mm to 4 mm, 0.1 mm to 3 mm, 0.1 mm to 2 mm, or 0.1 mm to 1 mm, and a Shore A hardness in the range of 20-90, 30-90, 40-90, 50-90, 60-90, 20-70, 30-70, or 65-75. The contact layer 116 comprises a rubber-based material, which, in some embodiments, includes at least one synthetic rubber. In some such embodiments, the synthetic rubber includes at least one of acrylonitrile-butadiene rubber (NBR), hydrogenated NBR, butadiene rubber, poly-isoprene rubber, butyl rubber chloroprene rubber (CR), EPDM rubber, polyurethane rubber, and acrylic rubber. In some embodiments, in addition to one or more synthetic rubbers, the contact layer 116 further includes a polysulfide rubber.

In some embodiments, the rubber-based material further includes a vulcanizing agent, such as, for example, an organic peroxide (e.g., benzoyl peroxide and the like), sulfur, or an organic sulfur-containing compound (e.g., tetramethylthiuram disulfide, N,N-dithiobismorpholine, and the like). In some embodiments, the amount of added vulcanizing agent is in the range of 0.3 to 4 parts by weight, preferably 0.5 to 3 parts by weight, based on 100 parts by weight of the rubber material.

In some embodiments, the rubber-based material further includes a vulcanization accelerator, such as, for example, an inorganic accelerator (e.g., calcium hydroxide, magnesia (MgO), and the like) or an organic accelerator such as a thiuram (e.g., tetramethylthiuram disulfide, tetraethyl-thiuram disulfide, and the like), a dithiocarbamate (e.g. zinc dibutyldithiocarbamate, zinc diethyldithiocarbamate, and the like), a thiazole (e.g., 2-mercaptobenzothiazole, N-dicyclohexyl-2-benzothiazole sulfenamide, and the like.), and a thiourea (e.g., trimethylthiourea, 30 N,N'-diethylthiourea, and the like).

In some embodiments, the rubber-based material may further include an auxiliary vulcanization accelerator, a filler, a reinforcer, a softener, a plasticizer, and/or an antioxidant.

In some embodiments the rubber-based material may comprise a compressible rubber based material, such as rubber foam.

Turning to the embodiment illustrated in FIG. 2B, a compressible counter film 110b is adapted to be mounted onto base 112. Compressible counter film 110b includes base layer 114, compressible layer 118, and contact layer 116, all substantially as described hereinabove, and further includes a surface modulating layer 140. The surface modulating layer may have a thickness in the range of 0.15 mm to 1 mm.

The surface modulating layer 140 may be attached along a first broad face thereof to the compressible layer 118 and may be attached along a second broad face thereof to the contact layer 116.

Without wishing to be bound by theory, it is understood by the Inventors that the surface modulation layer 140 as described herein is adapted to inhibit or prevent contact layer 116 from separating from compressible layer 118, or from being rotationally shifted relative thereto, during impression of the relief pattern on the substrate.

Additionally, as explained hereinbelow with reference to FIGS. 3A to 3C, and without wishing to be bound by theory, it is understood by the inventors that when compressible layer 118 is fully compressed, and additional pressure is applied to contact surface 116, deformation formed in compressible layer 118 are damped by surface modulation layer 140, such that the deformation appearing on the contact surface of contact layer 116 are modulated, for example lower or more spread out, than deformations appearing under the same pressure conditions in compressible counter film 110a of FIG. 2A. As a result, when using compressible counter film 110b, a greater amount of pressure that can be applied to contact layer 116 at the time of impression without damaging the substrate 130 or the relief pattern impressed thereon than when using compressible counter film 110a.

In some embodiments, surface modulating layer 140 includes a fabric layer impregnated with a rubber-based material. In some embodiments, the fabric layer may comprise a cotton, rayon, or polyester layer. In some embodiments, the fabric layer comprises a woven fabric that may have a density in the range of 10-30 threads/cm.

In some embodiments, surface modulating layer 140 includes two or more layers of fabric, directly attached to one another, for example by lamination, adhesive, or any other suitable attachment method known in the art.

In some embodiments, the rubber-based material with which the fabric layer is impregnated includes at least one of acrylonitrile butadiene copolymer rubber, EPDM rubber, and chloroprene rubber. The rubber-based material may be introduced into the fabric using any suitable method known in the art, for example by coating the rubber material on the fabric with a blade coater or by calendering. In some embodiments, the rubber-based material includes a vulcanizing agent such as organic peroxides, as well as sulfur, organic sulfur-containing compound, and the like. In some embodiments, the rubber-based material includes a vulcanizing accelerator such as inorganic accelerators (e.g. calcium hydroxide, magnesia (MgO), and the like) and/or organic accelerators (e.g. thiurams, dithiocarbamates, thiazoles, and the like). In some embodiments, the rubber-based material includes a softening agent such as fatty acid, cottonseed oil, tall oil, an asphalt substance, paraffin wax, and the like.

Referring now to the embodiment illustrated in FIG. 2C, a compressible counter film 110c is adapted to be mounted onto base 112. Compressible counter film 110c includes base layer 114, compressible layer 118, and contact layer 116, all substantially as described hereinabove, and further includes a reinforcing layer 142 and a rubber layer 144. The reinforcing layer 142 may have a thickness in the range of 0.15 mm to 1 mm, and the rubber layer 144 may have a thickness in the range of 0.15 mm to 5 mm, 0.15 mm to 4 mm, 0.15 m to 3 mm, 0.15 mm to 2 mm, or 0.15 mm to 1 mm. Reinforcing layer 142 may be a fabric layer, such as a cotton, rayon, or polyester layer, which may include a woven fabric. In some embodiments, the woven fabric may be impregnated with rubber, substantially as described hereinabove with reference to base layer 114 and to surface modulating layer 140.

Rubber layer 144 may include any suitable rubber, such as EPDM, polyurethane, natural rubber, silicone rubber, or bitumen rubber. The rubber layer may be formed by any suitable method known in the art, such as melting, emulsion impregnation, dual component reactive materials, or hold and hot compressing.

In the illustrated embodiment reinforcing layer 142 is disposed above, and immediately adjacent to, rubber layer 144, and layers 142 and 144 are disposed between compressible layer 118 and base layer 114. However, it will be appreciated that reinforcing layer 142 and rubber layer 144 may be disposed in other locations between base layer 114 and contact layer 116.

In some embodiments, the compressible counter films 110a, 110b, and 110c have a compressibility, in a direction perpendicular to a broad face thereof, in the range of 5-30%, 6-30%, 9-25%, 9-20%, or 9-15% at 1.35 MPa.

In some embodiments, the compressible counter films 110a, 110b, and 110c may have a thickness in the range of 0.5 mm to 10 mm, 0.5 mm to 8 mm, or 1 mm to 7 mm. In some embodiments, the compressible counter films 110a and 110b may have a thickness in the range of 0.5 mm to 4 mm, 1 mm to 3 mm, or 1 mm to 2 mm. In some embodiments, the compressible counter film 110c may have a thickness in the range of 2 mm to 8 mm or 3 mm to 7 mm.

Figure 3A:
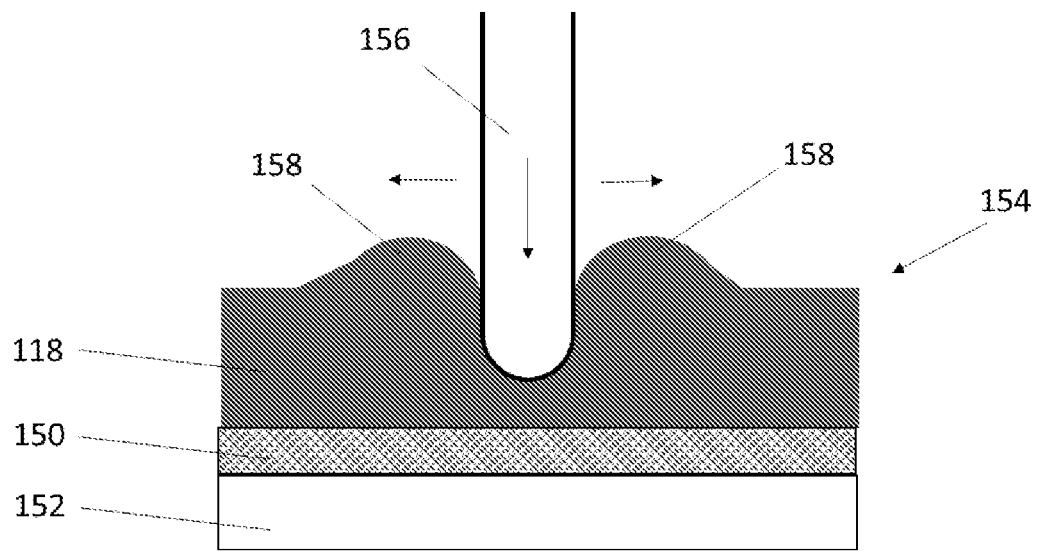
FIGS. 3A, 3B, and 3C are schematic cross-sectional diagrams demonstrating the mechanical reaction of an incompressible counter film (FIG. 3A), of the inventive compressible counter film of FIG. 2A (FIG. 3B), and of the inventive compressible counter film of FIG. 2B (FIG. 3C) in response to pressure applied thereto.
Figure 3B:
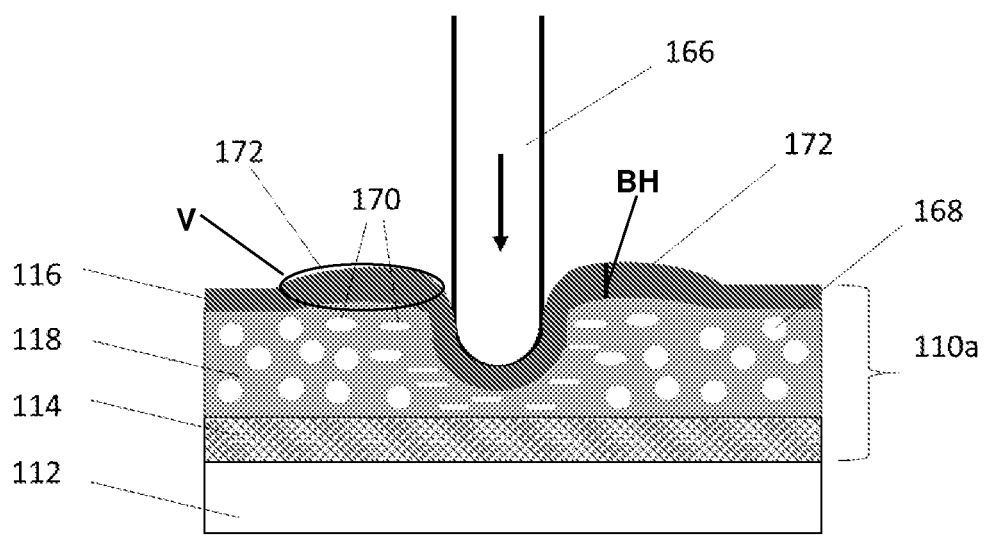
Figure 3C:
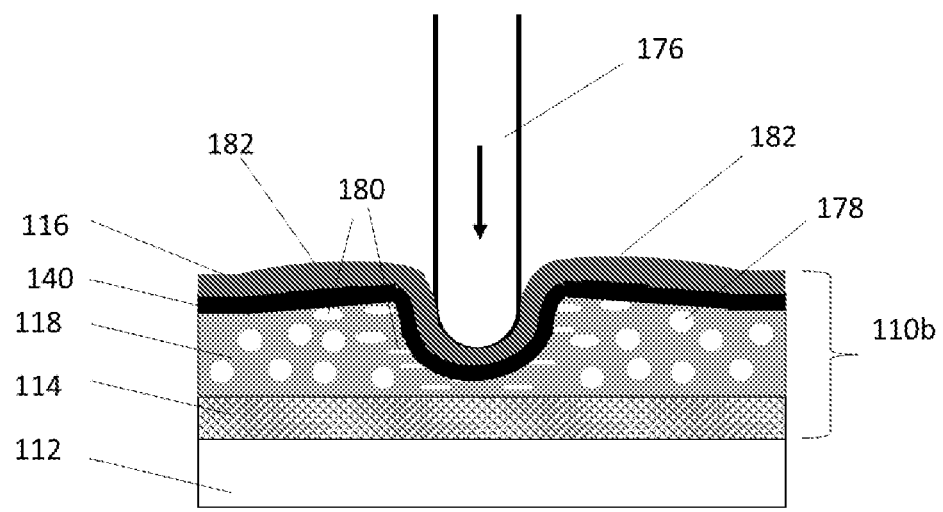

FIGS. 3A, 3B, and 3C are schematic cross-sectional diagrams demonstrating the mechanical reaction of an incompressible counter film (FIG. 3A), of the inventive compressible counter film of FIG. 2A (FIG. 3B), and of the inventive compressible counter film of FIG. 2B (FIG. 3C) in response to pressure applied thereto.

As seen in FIG. 3A, some prior art die and counter die systems include an incompressible, though often resilient, counter film 150 mounted on a base 152. When pressure is applied to a contact surface 154 of the counter film 150 in a direction perpendicular to a broad face of counter film 150 by a pressure source 156, material of counter film 150 is pushed aside adjacent pressure source 156, resulting in bulges 158 forming in contact surface 154 adjacent the pressure point, causing lateral pressure to be applied to additional portions of the contact surface 154. It is appreciated that such lateral pressure can cause wrinkling or other damage to a substrate being impressed with a relief pattern using such a counter film.

Turning to FIG. 3B, it is seen that when pressure is applied to contact layer 116 of the compressible counter film 110a described hereinabove with reference to FIG. 2A, in a direction perpendicular to a broad face of the film 110a, by a pressure source 166, the pressure is absorbed by the compressible layer 118, causing air pockets 168 therein to empty and deflate beneath the pressure point, as indicated by reference numeral 170. When compressible layer 118 is fully compressed by the pressure applied to compressible counter film 110a, and the compressible layer becomes substantially incompressible, any additional pressure applied to compressible counter film 110a results in deformation of the contact surface, for example by creation of bulges 172. It will be appreciated that bulges 172 have a bulge height BH and a bulge volume V indicated by an oval surrounding the volume in FIG. 3B.

Referring now to FIG. 3C, it is seen that when pressure is applied to contact layer 116 of the compressible counter film 110b described hereinabove with reference to FIG. 2B, in a direction perpendicular to a broad face of the film 110b, by a pressure source 176, the pressure is absorbed by the compressible layer 118, causing air pockets 178 therein to empty and deflate beneath the pressure point, as indicated by reference numeral 180. When compressible layer 118 is fully compressed by the pressure applied to compressible counter film 110b, and the compressible layer becomes substantially incompressible, any additional pressure applied to compressible counter film 110b results in deformation of the surface of compressible layer 118. However, the deformation of the compressible layer 118 is damped by the surface modulation layer 140, such that the resulting deformation of contact layer 116, here shown in the form of bulges 182, is modulated. Specifically, the bulges 182 typically have the same, or substantially the same, bulge volume V as the bulges 172 formed when using compressible counter film 110a and shown in FIG. 3B, but the bulge height of bulges 182 is lower than bulge height BH of bulges 172 and/or the bulges 182 cover a greater surface area, or are more spread out, than bulges 172 shown in FIG. 3A.

EXAMPLES

Reference is now made to the following examples, which together with the above description, illustrate the invention in a non-limiting fashion.

Example 1

Incada Silk GC1 325 gsm Folding Box Board paper commercially available from Iggesund of Sweden was creased on a Euclid digital creasing and cutting machine commercially available from Highcon LTD. of Yavne, Israel, using a standard counter film including a 0.25 mm PET base layer and a 1.75 mm polyurethane layer, and having a Shore A hardness value of 69.

Creasing was performed on a rotational Digital Adhesive Rule Technology (DART) system using Euclid DART photopolymer rules with different rule penetration depths. In other words, in each instance, the rule penetrated the counter to a different depth. As is well known in the art, a greater penetration depth reduces the amount of force required to fold the boxboard, or other substrate, along the formed crease, however, with such greater penetration depth there is a greater tendency to wrinkling, tearing, or cracking of the paper or boxboard adjacent the crease line.

The folding performance of the creased boxboard was measured on a 1270 PCA Score Bend/Opening Force Tester commercially available from Thwing Albert Instrument Company of West Berlin, N.J., USA, which provides a TAPPI T577 Score Bend Test Standard for determining the score bend resistance of scored (creased) and unscored paperboard samples, for calculation of a score ratio. Specifically, the score ratio test was carried out as a two-cycle bending test. During the first cycle the scored sample was bent to a specific stop angle of 90 degrees, and was then returned to the starting position (an angle of 0 degrees). The process was repeated for an unscored sample of the same paper. The score ratio was calculated as ratio of the peak bending force for the scored paperboard to the peak bending force of the unscored paperboard, in percentages.

The results of the test of Example 1, as well as those of the test of Example 2 described hereinbelow, are summarized in Table 1, which includes a first column listing the rule penetration depth, and for each of Example 1 and Example 2 includes a column specifying the condition of the paper following impression of the crease thereon, and two columns relating to the score ratio, in percentage, in the grain direction and the in the cross grain direction.

As seen in Table 1, when using a standard polyurethane counter film, the maximal rule penetration depth at which the paper was not damaged is 0.7 mm, at which depth the score ratio was 73% for a crease line in the grain direction of the paper, and 62% for a crease line in a cross grain direction of the paper.

Example 2

The experiment of Example 1 was repeated with the same paper and machinery, where the counter film of Example 1 was replaced with an Aeropress Special UV red compressible counter film, commercially available from Birkan of Germany. The compressible counter film includes a fabric base layer, a compressible rubber foam layer, a fabric surface modulating layer, and a rubber contact layer, as described hereinabove with reference to FIG. 2B, has a total thickness of 1.95 mm, compressibility of 9% at 1.35 MPa, and a shore A hardness value of 75.

As seen in Table 1, when using the Aeropress Special UV red compressible counter film, the maximal rule penetration depth at which the paper was not damaged is 1.03 mm, at which depth the score ratio was 65% for a crease line in the grain direction of the paper, and 55% for a crease line in a cross grain direction of the paper. As such, it is evident that creasing performance using the compressible counter film is improved relative to creasing performance using the incompressible counter film.

film of Example 4 than when using the polyurethane counter film of Example 3. As such, it is evident that creasing performance using the compressible counter film is improved relative to creasing performance using the incompressible counter film.

TABLE 2

|  | Maximal Rule penetration depth without damage to the paper, in mm | Score Ratio, in % (grain direction) | Score Ratio, in % (cross grain direction) |
| --- | --- | --- | --- |
| Incompressible polyurethane counter film (Example 3) | 0.66 | 75 | 66 |
| Aeropress Special UV red compressible counter film (Example 4) | 0.96 | 63 | 56 |

In the context of the present application and of the claims herein, the term "attached" relates to direct attachment between two objects, attachment between two objects via an adhesive layer, or attachment between two objects via one or more intermediate objects or layers.

It will be appreciated that certain features of the invention, which are, for clarity, described in the context of separate

TABLE 1

| | Incompressible polyurethane counter film (Example 1) | | | Aeropress Special UV red compressible counter film (Example 2) | | |
| --- | --- | --- | --- | --- | --- | --- |
| Rule penetration depth, in mm | Paper Condition | Score Ratio, in % (grain direction) | Score Ratio, in % (cross grain direction) | Paper Condition | Score Ratio, in % (grain direction) | Score Ratio, in % (cross grain direction) |
| 0.49 | Acceptable | 84 | 77 | acceptable | 91 | 85 |
| 0.7 | Acceptable | 73 | 62 | acceptable | 84 | 70 |
| 0.92 | Wrinkles | 65 | 55 | acceptable | 68 | 57 |
| 1.03 | Wrinkles | 60 | 53 | acceptable | 65 | 55 |
| 1.13 | Tearing | 56 | 49 | wrinkles | 63 | 52 |

Example 3

The creasing process of Example 1 was repeated using MCM/GD2 380 gsm fully coated white lined chipboard paper commercially available from MM Karton, of Germany.

As seen in Table 2, the maximal rule penetration depth at which the paper was undamaged was 0.66 mm, and further increasing the rule depth penetration resulted in the paper cracking adjacent the crease line. The score ratio results are presented in Table 2.

Example 4

The creasing process of Example 2 was repeated using MCM/GD2 380 gsm fully coated white lined chipboard paper commercially available from MM Karton, of Germany.

As seen in Table 2, the maximal rule penetration depth at which the paper was undamaged was 0.96 mm. The score ratio results are presented in Table 2.

As seen in Table 2, the maximal rule penetration depth at which the paper was not damaged is higher when using the compressible counter film of Example 4 than when using the polyurethane counter film of Example 3. Additionally, the score ratio is lower when using the compressible counter embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification, including PCT application publication number WO2011/145092, PCT application publication number WO2015/155685, and PCT application publication number WO2013/030828 are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system for impressing a relief pattern on a substrate, the system comprising: at least one male die including a contact surface defining the relief pattern; a compressible counter film including:

a base layer;

a contact layer disposed opposite said contact surface of said at least one male die and spaced therefrom;

a compressible layer disposed between said base layer and said contact layer and attached thereto; and a surface modulating layer disposed between said base layer and said contact layer;

said contact layer being featureless in a region thereof opposing the relief pattern on said at least one male die; and a compression mechanism adapted to move said at least one male die and said compressible counter film towards one another, in an operative mode;

wherein, in an operative mode, when the substrate is disposed between said contract surface and said contact layer, said compression mechanism moves said at least one male die and said compressible counter film towards one another, such that said at least one male die engages a first broad surface of the substrate and said contact layer of said compressible counter film engages an opposing broad surface of the substrate, so as to impress the relief pattern on the substrate;

and wherein said surface modulating layer adapted such that, in said operative mode, when pressure applied to said contact layer exceeds a pressure required to fully compress said compressible layer, said surface modulating layer responds by modulating at least one of a height and a surface area of a deformation formed on said contact layer, surrounding the relief pattern.

2. The system of claim 1, wherein said compressible counter film has a compressibility, in a direction perpendicular to a broad face of said compressible counter film, in the range of 5-30%, 6-30%, 9-25%, 9-20%, or 9-15% at 1.35 MPa.

3. The system of claim 1, wherein said surface modulating layer is attached along a first broad face thereof to said compressible layer and along a second broad face thereof to said contact layer.

4. The system of claim 1, wherein said surface modulating layer is adapted to inhibit said contact layer from separating from said compressible layer or from being rotationally shifted relative thereto during impression of the relief pattern on the substrate.

5. The system of claim 1, wherein said surface modulating layer has a thickness in the range of 0.15 mm to 1 mm.

6. The system of claim 1, wherein said surface modulating layer includes a fabric layer impregnated with a rubber-based material.

7. The system of claim 6, wherein said fabric layer comprises at least one material selected from the group consisting of polyester, rayon, and cotton.

8. The system of claim 6, wherein said fabric layer comprises a woven fabric layer.

9. The system of claim 6, wherein said fabric layer comprises at least two layers of fabric attached to one another.

10. The system of claim 1, said contact layer of said compressible counter film having a Shore A hardness in the range of 60-90 or 65-75.

11. The system of claim 1, wherein said compressible layer is adapted to decrease lateral deformation resulting from pressure applied to said compressible counter film relative to the lateral deformation that would result from the same pressure applied to an otherwise identical counterfilm lacking at least one of the elements recited in claim 1.

12. The system of claim 1, wherein said compressible layer comprises a rubber foam layer.

13. The system of claim 1, wherein said compressible layer is directly attached to said base layer.

14. The system of claim 1, wherein said contact layer comprises a rubber-based material.

15. The system of claim 1, wherein said system further comprises a heating mechanism arranged to apply heat to said substrate during impression of the relief pattern thereon.

16. A method for impressing a relief pattern on a substrate, the method comprising:

placing a substrate between at least one male die and a compressible counter film, wherein the at least one male die includes a contact surface defining the relief pattern, and wherein the compressible counter film includes:

a base layer;

a contact layer disposed opposite said contact surface of said at least one male die and spaced therefrom;

a compressible layer disposed between said base layer and said contact layer and attached thereto, and a surface modulating layer disposed between said base layer and said contact layer;

said contact layer being featureless in a region thereof opposing the relief pattern on said at least one male die, said compressible counter film having a compressibility, in a direction perpendicular to a broad face of said compressible counter film, in the range of 5-30% at 1.35 MPa; and moving said at least one male die and said compressible counter film towards one another such that said at least one male die engages a first broad surface of the substrate and said contact layer of said compressible counter film engages an opposing broad surface of the substrate so as to impress the relief pattern on the substrate.

17. The method of claim 16, wherein the substrate is selected from the group consisting of (a) a fibrous substrate, (b) a metal foil and (c) a plastic substrate.

18. The method of claim 17, wherein the substrate is a plastic substrate and the method further comprises applying heat directly to said plastic substrate during impression of the relief pattern thereon.

* * * * *